(12) United States Patent
Gupta et al.

(10) Patent No.: US 12,531,100 B2
(45) Date of Patent: Jan. 20, 2026

(54) WRITE-READ CIRCUIT WITH A BIT LINE MULTIPLEXER FOR A MEMORY DEVICE

(71) Applicant: IMEC VZW, Leuven (BE)

(72) Inventors: Mohit Gupta, Heverlee (BE); Stefan Cosemans, Leuven (BE)

(73) Assignee: IMEC VZW, Leuven (BE)

( * ) Notice: Subject to any disclaimer, the term of this patent is extended or adjusted under 35 U.S.C. 154(b) by 43 days.

(21) Appl. No.: 18/514,100

(22) Filed: Nov. 20, 2023

(65) Prior Publication Data

US 2024/0170034 A1 May 23, 2024

(30) Foreign Application Priority Data

Nov. 22, 2022 (EP) .................................... 22208698

(51) Int. Cl.
*G11C 11/16* (2006.01)
(52) U.S. Cl.
CPC ...... *G11C 11/1675* (2013.01); *G11C 11/1655* (2013.01); *G11C 11/1673* (2013.01)
(58) Field of Classification Search
CPC ............ G11C 11/1673; G11C 11/1655; G11C 11/1675
USPC ......................................................... 365/158
See application file for complete search history.

(56) References Cited

U.S. PATENT DOCUMENTS

| | | | | |
|---|---|---|---|---|
| 10,446,213 | B1* | 10/2019 | Zhang | ................. G11C 11/1697 |
| 2002/0093032 | A1 | 7/2002 | Hanzawa et al. | |
| 2010/0091581 | A1 | 4/2010 | Winklehoff et al. | |
| 2017/0221538 | A1* | 8/2017 | Kim | ..................... G11C 11/1675 |
| 2017/0309330 | A1* | 10/2017 | Pyo | ........................ G11C 13/004 |
| 2019/0108872 | A1* | 4/2019 | Gupta | .................... G11C 11/419 |
| 2019/0228292 | A1* | 7/2019 | Yasuda | ..................... G06N 3/04 |
| 2019/0287594 | A1* | 9/2019 | Osada | ..................... H10N 50/85 |
| 2023/0360700 | A1* | 11/2023 | Richter | .............. G11C 13/0028 |

OTHER PUBLICATIONS

Extended European Search Report dated Mar. 31, 2023 in European Application No. 22208698.5, in 8 pages.

* cited by examiner

*Primary Examiner* — Sung Il Cho

(74) *Attorney, Agent, or Firm* — Knobbe, Martens, Olson & Bear, LLP

(57) ABSTRACT

A memory device with multiplexers for multiplexing write and read operations to bit lines is provided. In one aspect, a write-read circuit includes a multiplexer for multiplexing the write and read operations. The multiplexer includes a plurality of select devices, each select device being associated with one of a plurality of bit lines, and each select device including a first transistor and a second transistor. The write-read circuit further includes a controller configured to, for a write operation using a particular bit line, control the multiplexer to turn on both transistors of the first select device associated with the particular bit line, and for a read operation using the particular bit line, control the multiplexer to turn on the first transistor and turn off the second transistor of the first select device associated with the particular bit line.

13 Claims, 5 Drawing Sheets

| | SEL_R | SEL | SELbar |
|---|---|---|---|
| Write | 1 | 1 | 0 |
| Read | 1 | 0 | 1 |

71 — perform a write operation using a particular bit line of a plurality of bit lines of the memory device, by turning on a first transistor and a second transistor of a first select device of a first multiplexer, wherein the first select device is associated with the particular bit line.

72 — perform a read operation using the particular bit line, by turning on the first transistor and turning off the second transistor of the first select device associated with the particular bit line

WRITE-READ CIRCUIT WITH A BIT LINE MULTIPLEXER FOR A MEMORY DEVICE

CROSS-REFERENCE TO RELATED APPLICATIONS

This application claims foreign priority to European Patent Application No. EP 22208698.5, filed Nov. 22, 2022, which is incorporated by reference herein in its entirety.

BACKGROUND

Technical Field

The disclosed technology relates to memory devices, in particular, to memory devices with multiplexers configured to multiplex write and read operations to bit lines. The disclosed technology provides a write-read circuit for such a memory device. The write-read circuit includes at least one multiplexer for a plurality of bit lines, wherein the multiplexer is configurable depending on whether a read operation or a write operation is performed using one of the plurality of bit lines.

Description of the Related Technology

On-chip embedded memory devices with non-volatility, for instance, a magnetic random-access memory (MRAM) device, may enable energy and computational efficiency with a memory density exceeding that of a high-density static random-access memory (SRAM) device. These non-volatile memory devices may target, for example, lower level caches, such as L2-L3-L4. Reading is more crucial than writing for such lower level caches. Any improvement in reading may thus help replacing SRAM devices. The bit line capacitance can thereby be a crucial parameter, which determines the read delay as well as the read energy. For example, the higher the bit line capacitance, the more read delay may be experienced.

Multiplexing in memory devices can help reduce the periphery areas and IOs. The multiplexing can be implemented using multiplexers, which connect the memory macro (which includes the memory cells and memory lines) with the write and read circuitry. The memory macro can particularly include spin transfer torque (STT) or spin orbit torque (SOT) memory cells (wherein both are current based memory cells).

The write and read circuitry can determine the write current and the read current, respectively. A higher write current requirement can lead to larger multiplexer dimensions, which can increase bit line loading. Further, the read delay and read energy can be increased with the higher bit line loading. A reduction of the multiplexer size (for example, from 16:1 to 4:1), in order to decrease the bit line loading, may unfortunately increase the periphery area, and hence the leakage.

SUMMARY OF CERTAIN INVENTIVE ASPECTS

In view of the above, an objective of the disclosed technology to provide improved multiplexing of write and read operations to bit lines of a memory device. The disclosed technology can provide a write-read circuit with a multiplexer, which does not increase the bit line loading, in particular, not during read operations. Another objective is to avoid an increase in the periphery area and leakage, respectively.

These and other objectives can be achieved by one or more embodiments as disclosed herein. Advantageous implementations are also described in one or more embodiments as disclosed herein.

A first aspect of the disclosed technology is a write-read circuit for a memory device. The write-read circuit includes a first multiplexer for multiplexing write and read operations to the memory device. The first multiplexer includes a plurality of first select devices, where each first select device is associated with one of a plurality of bit lines of the memory device, and each first select device includes a first transistor and a second transistor The write-read circuit can include a controller for controlling the first multiplexer. For a write operation using a particular bit line of the bit lines, the controller is configured to turn on both transistors of the first select device that is associated with the particular bit line. For a read operation using the particular bit line, the controller is configured to turn on the first transistor and turn off the second transistor of the first select device that is associated with the particular bit line.

In embodiments of the write-read circuit according to the first aspect, the first multiplexer may be divided into a write part and a read part. That is, each select device of the first multiplexer may be divided into the first transistor and the second transistor, where the first transistor is used as a read transistor, and both the first transistor and the second transistor are used as write transistors. The transistors may, for instance, be NMOS or PMOS transistors. During the write operation, both transistors of the first select device are turned on, and during the read operation only the read transistor is turned on. This may lead to a reduction of the capacitive loading on the particular bit line when performing the read operation event, without reducing the multiplexer dimension. Thus, the read delay and the read energy can also be reduced. Further, the periphery area also does not have to be increased and likewise the leakage may stay the same. During the write operation, the two turned on transistors can ensure a sufficient write current.

In some implementations, the write-read circuit can include a second multiplexer for multiplexing the write and read operations to the memory device. The second multiplexer can include a plurality of second select devices. Each second select device is associated with one of a plurality of reference bit lines of the memory device. Each of the reference bit lines is related to one of the bit lines, and each second select device includes a first transistor and a second transistor. The controller can also be configured to control the second multiplexer. For the write operation using the particular bit line, the controller is configured to turn on both transistors of the second select device that is associated with a particular reference bit line of the plurality of reference bit lines, which is related to the particular bit line. For the read operation using the particular bit line, the controller is configured to turn on the first transistor and turn off the second transistor of the second select device that is associated with the particular reference bit line.

The second multiplexer can be divided in a similar manner as the first multiplexer, into a read part and a write part, by dividing each second select device. The second multiplexer can further support the reduction of the capacitive loading on the particular bit line when performing the read operation.

In some implementations of the write-read circuit, the first transistor of each select device has a smaller transistor width than the second transistor of that select device.

This can enable reducing the capacitive loading of the bit line when performing the read operation, and at the same time ensure sufficient write current when performing the write operation.

In some implementations of the write-read circuit, a ratio of the transistor width of the second transistor to the transistor width of the first transistor of each select device is in a range of 5:1 to 10:1.

This range has proven beneficial for many different implementations of the memory device of the present disclosure, and accordingly of the write-read circuit. The range may be adjusted if needed.

In some implementations of the write-read circuit, the first transistor of each select device is configured for a read current of 10-20 µA, and the first transistor and the second transistor of each select device are together configured for a write current of 50-250 µA.

In some implementations of the write-read circuit, each select device further includes a third transistor, and the controller is configured to turn on the third transistor of the select device associated with the particular bit line or the particular reference bit line, if at least one of the first transistor and the second transistor of that select device is turned on for the write operation or the read operation using the particular bit line.

The third transistor may support the read and write operations, respectively.

In some implementations of the write-read circuit, for each select device, the first transistor and the second transistor are NMOS transistors and the third transistor is a PMOS transistor. Alternatively, the first transistor and the second transistor are PMOS transistors and the third transistor is an NMOS transistor.

In some implementations, the write-read circuit further includes a sense amplifier and a write driver connected, respectively, to the first multiplexer and/or the second multiplexer.

In some implementations of the write-read circuit, the sense amplifier is connected by a first clamp transistor to the first multiplexer and by a second clamp transistor to the second multiplexer.

A second aspect of the disclosed technology is a memory device including: a plurality of memory cells; a plurality of bit lines, wherein multiple memory cells of the plurality of memory cells are connected to each of the bit lines; and a write-read circuit according to the first aspect or any of the above implementations. The write operation using the particular bit line of the plurality of bit lines of the memory device is for writing into one of the memory cells connected to the particular bit line, and the read operation using the particular bit line is for reading from one of the memory cells connected to the particular bit line.

In some implementations, the memory device further includes a plurality of reference bit lines. The multiple memory cells of the plurality of memory cells are connected to each of the reference bit lines. Each memory cell of the memory device is connected to one of the bit lines and to one of the reference bit lines. The write operation using the particular bit line is for writing into one of the memory cells connected to the particular bit line and to the particular reference bit line. The read operation using the particular bit line is for reading from one of the memory cells connected to the particular bit line and to the particular reference bit line.

In some implementations of the memory device, each memory cell of the memory device includes a magnetic stack. The memory device can be configured to: in the write operation, pass a current through the magnetic stack or past the magnetic stack; and in the read operation, pass a current through the magnetic stack.

In some implementations, the memory device is a MRAM device, a STT MRAM device, or a SOT MRAM device.

The memory device of the second aspect can achieve all of the advantages provided by the write-read circuit of the first aspect, including those described above.

A third aspect of the disclosed technology is write-read method for multiplexing write and read operations to a memory device. The method includes: for performing a write operation using a particular bit line of a plurality of bit lines of the memory device, turning on a first transistor and a second transistor of a first select device of a first multiplexer, wherein the first select device is associated with the particular bit line; and for performing a read operation using the particular bit line, turning on the first transistor and turning off the second transistor of the first select device associated with the particular bit line.

In some implementations, the write-read method further includes: for performing the write operation using the particular bit line, turning on a first transistor and a second transistor of a second select device of a second multiplexer, wherein the second select device is associated with a particular reference bit line of plurality of reference bit lines of the memory device, and wherein the particular reference bit line is related to the particular bit line; and for performing the read operation using the particular bit line, turning on the first transistor and turning off the second transistor of the second select device that is associated with the particular reference bit line.

The method of the third aspect can achieve the same advantages as the write-read circuit of the first aspect, and may be extended by respective implementations as described above for the write-read circuit of the first aspect.

BRIEF DESCRIPTION OF THE DRAWINGS

The above-described aspects and implementations are explained in the following description of embodiments with respect to the enclosed drawings:

FIG. 7 shows an example method according to the disclosed technology for operating a write-read circuit.

DETAILED DESCRIPTION OF CERTAIN ILLUSTRATIVE EMBODIMENTS

Figure 1:
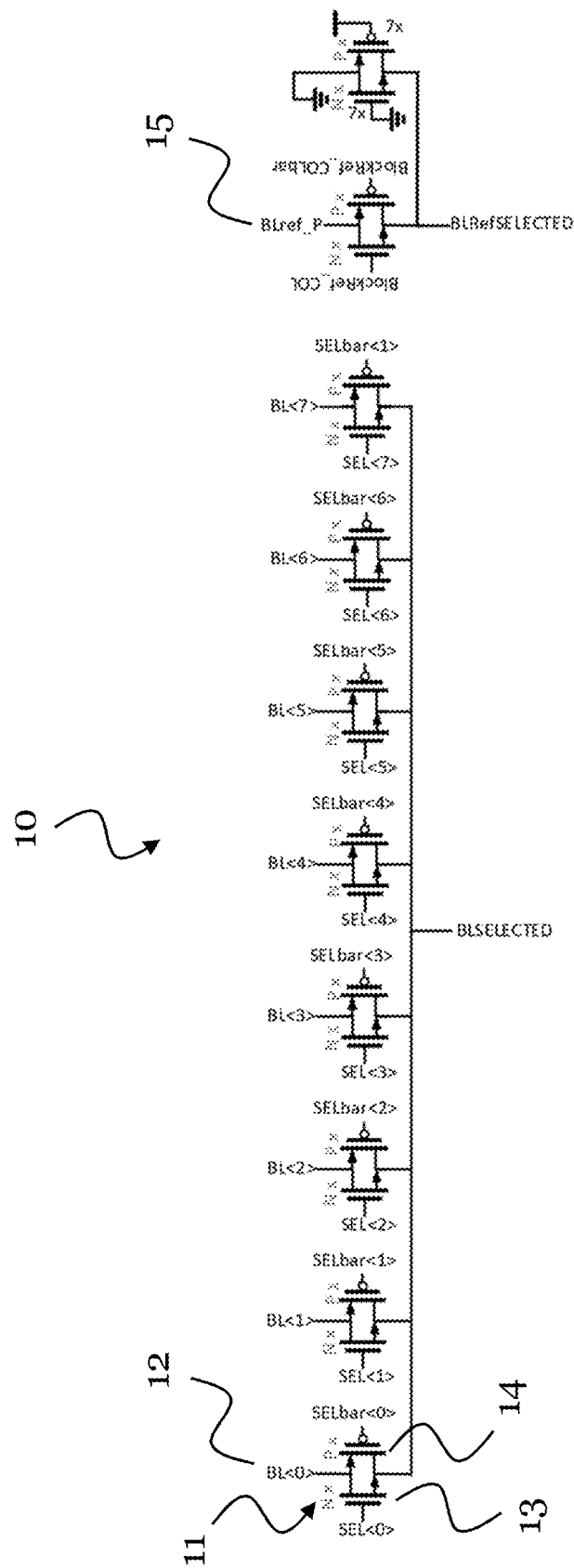
FIG. 1 shows an exemplary write-read circuit for multiplexing write and read operations using bit lines of a memory device.

FIG. 1 shows a conventional read-write circuit 10. The exemplary circuit 10 includes a multiplexer for multiplexing write and read operations using a plurality of bit lines 12. The multiplexer includes a select device 11 for each bit line 12. Each of the select devices 11 includes at least one transistor 13, or as shown in FIG. 1 may include two transistors 13 and 14. The transistors 13 and 14 have dimensions Nx and Px, respectively, which may be selected according to a required switching current. That is, Nx and Px may particularly be determined according to the required write current.

For the read-circuit 10 of FIG. 1, independent of whether a write operation or a read operation is performed using a particular bit line 12, both transistors 13 and 14 of the respective select device 11, which is associated with the particular bit line 12, are turned on (that is, are activated).

However, for instance, STT and SOT memory devices are current based memory devices. A STT switching (write) current is, for example, more than 100 µA, and a SOT switching (write) current is even more than 200 µA. In contrast, a read current can be 20 µA for STT, and can be between 30-40 µA for SOT. That is, the read current is almost 5-6 times less than the write current. This means the transistors 13, 14 may be overdesigned for the read operation.

The high write current requirement can lead to high multiplexed dimensions (for example, 16:1), which increases loading on the bit lines. The large bit line loading can be a problem during the read operation. In particular, the read delay and the read energy can increase with higher bit line loading. However, if one were to simply decrease the multiplexer dimension (for example, from 16:1 to 4:1), this would reduce the bit line loading, but would increase the periphery area and hence the leakage.

Figure 2:
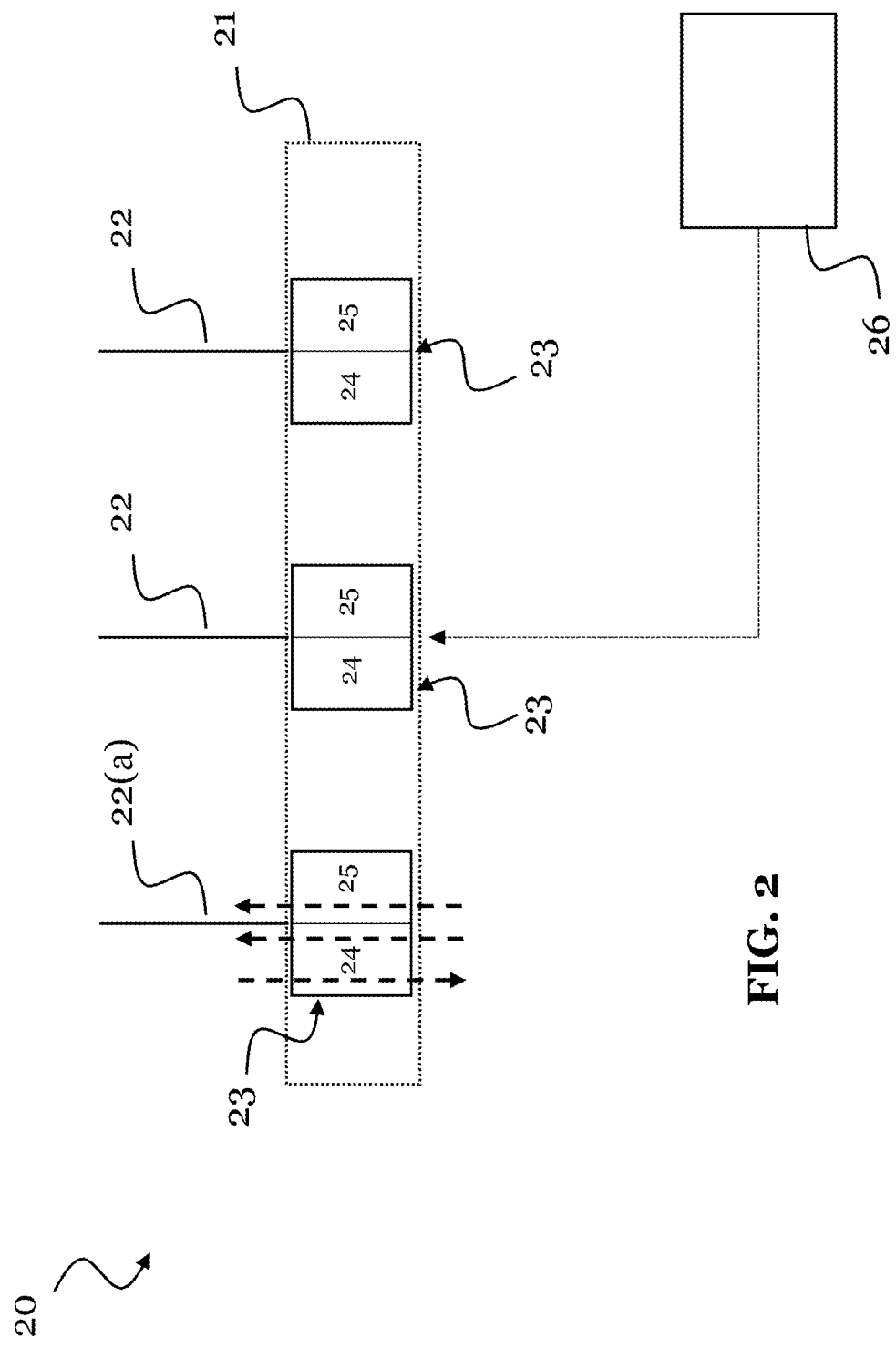
FIG. 2 shows an example write-read circuit according to the disclosed technology.

In order to decrease the read delay and read energy without increasing the periphery area and leakage, embodiments of the disclosed technology propose a write-read circuit 20 for a memory device, for example as shown in FIG. 2. The write-read circuit 20 is particularly useful if the memory device is a MRAM device, a STT memory device, or a SOT memory device. In such memory devices, each memory cell of the memory device may include a magnetic stack, and a write operation to a memory cell passes a current through the magnetic stack or passes a current past the magnetic stack, and a read operation from the memory cell passes a current through the magnetic stack. It will be understood that other types of memory devices can be suitably implemented.

The write-read circuit 20 of FIG. 2 includes at least one multiplexer, particularly including a first multiplexer 21 for multiplexing write and read access to bit lines 22 of the memory device. The first multiplexer 21 includes a plurality of first select devices 23. Each of the first select devices 23 is associated with one of a plurality of bit lines 22 of the memory device, and may control access to that bit line 22, in order to perform a write operation or a read operation using that bit line 22. The write or read operation using that bit line 22 may write data into a memory cell, or may read data from a memory cell, connected to that bit line 22.

Each of the first select devices 23 includes a first transistor 24 and a second transistor 25, which may be referred to as select or access transistors. If a particular bit line 22 is to be used for the write operation or the read operation, one or both of the transistors 24, 25 can be activated (turned on), in order to provide the access to the particular bit line 22, as described below.

The write-read circuit 20 includes a controller 26 configured to control the first multiplexer 21. The controller 26 is configured to control the write-read circuit 20 to perform the write operation or the read operation using the particular bit line 22. For the write operation using the particular bit line 22, the controller 26 is configured to turn on both transistors 24, 25 of the first select device 23, which is associated with the particular bit line 22. For the read operation using the particular bit line 22, the controller 26 is configured to turn on the first transistor 24 and to turn off the second transistor 25 of the first select device 23, which is associated with the particular bit line 22.

Since only the first transistor 24 (read transistor) is turned on for the read operation, the first transistor 24 can be made smaller, due to the lower read current requirement, which allows decreasing the capacitive loading of the particular bit line 22 during the read operation, and thus reducing the read delay and read energy. By also turning on the second transistor 25 for the write operation, the higher write current requirement can be met. For example, the first transistor 24 may be configured for a read current of 10-20 µA, and the first and second transistor 24, 25 together may be configured for a write current of 50-250 µA. This may be achieved for a ratio of the transistor width of the second transistor 25 to the transistor width of the first transistor 24 being in a range of 5:1 to 10:1.

Figure 3:
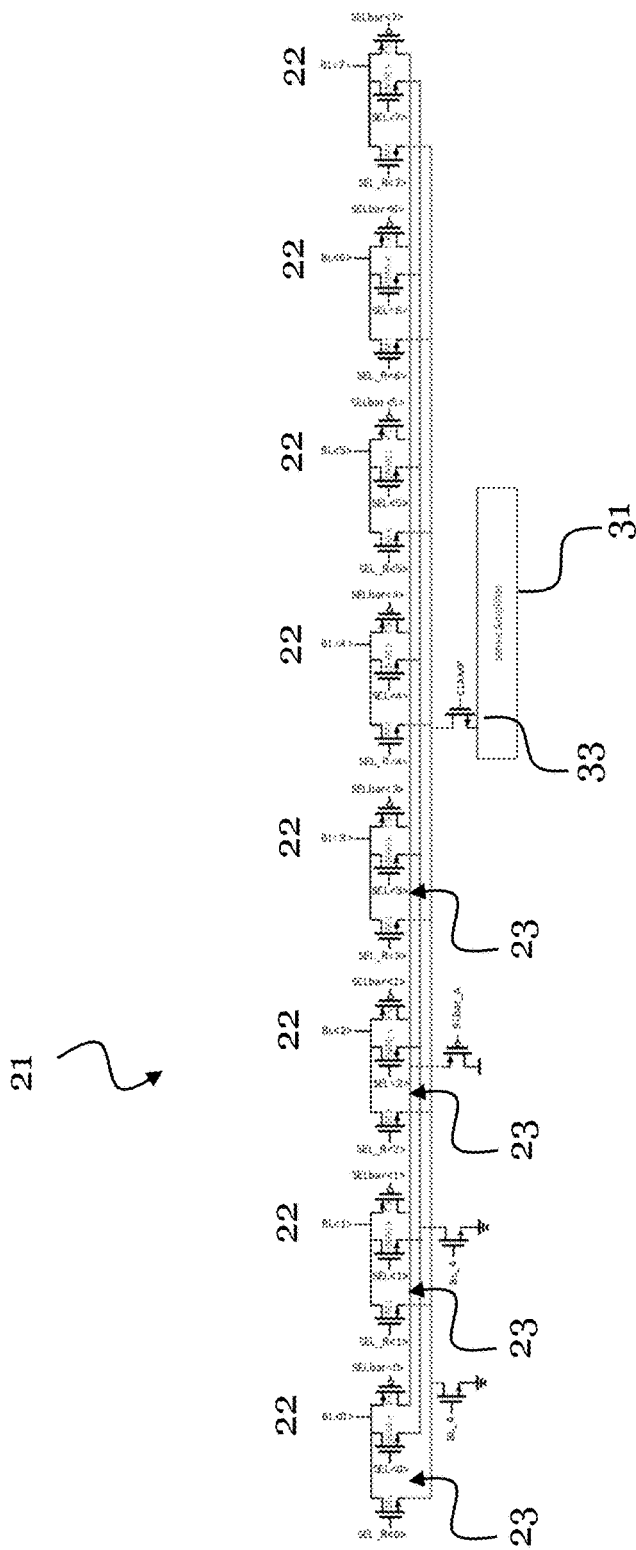
FIG. 3 shows an example of a write-read circuit according to the disclosed technology, for multiplexing write and read operations using bit lines of a memory device.

FIG. 3 shows an example of the write-read circuit 20 according to an embodiment of the disclosed technology, which may build on the circuit 20 shown in FIG. 2. Same elements are labelled with the same reference signs and may function likewise.

Figure 4:
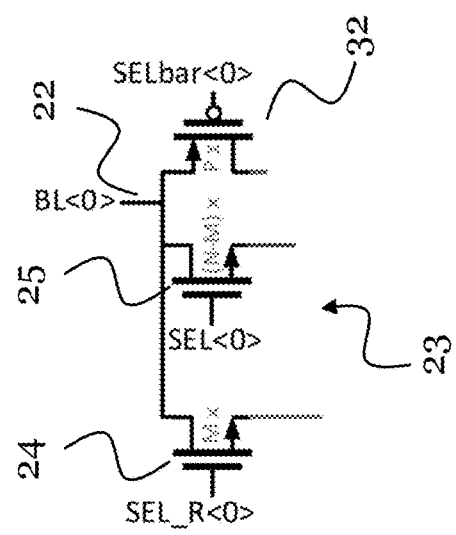
FIG. 4 shows an example of a select device associated with a bit line.

In FIG. 3, the first multiplexer 21 of the circuit 20 is shown, which is designed for multiplexing to eight bit lines 22 (BL<0> to BL<7>). Each bit line 11 is associated with a first select device 23. An enlarged view of an exemplary first select device 23 is shown in FIG. 4. The first select device 23 includes the first transistor 24 (SEL_R) and the second transistor 25 (SEL). As also shown in FIG. 3, the first select device 23 may further include a third transistor 32 (SELbar).

The controller 26 (not shown in FIG. 3 and FIG. 4) is configured to turn on the third transistor 32 of the first select device 23, if at least one of the first transistor 24 and the second transistor 25 of the first select device 23 is turned on for the write operation or the read operation using the particular bit line 22 associated with the first select device 23. The first transistor 24 and second transistor 25 are controlled as described with respect to FIG. 2.

The first transistor 24 and the second transistor 25 may be NMOS transistors, and the third transistor 32 may be a PMOS transistor as shown in FIG. 3. Alternatively, the first transistor 24 and the second transistor 25 could be PMOS transistors, and the third transistor 32 could be an NMOS transistor.

FIG. 3 shows further that the write-read circuit 20 may also include a sense amplifier 31. The sense amplifier 31 may be used for reading using the bit lines 22, that is, it may sense data on the particular bit line 22 during the read operation. The sense amplifier 31 can be connected by a first clamp transistor 33 to the first multiplexer 21.

The write-read circuit 20 may further include access transistors (denoted BL_A and BLbar_A in FIG. 3), in order to provide access to the first and second transistors 24, 25 of the first select devices 25, and respectively the third transistors 32 of the first select devices 23. The write-read circuit 20 may further include a write driver (not shown in FIG. 3), which is connected to the first multiplexer 21 and configured to drive the write operation, that is, to provide the data to be written, using the particular bit line 22.

Figures 5, 6:
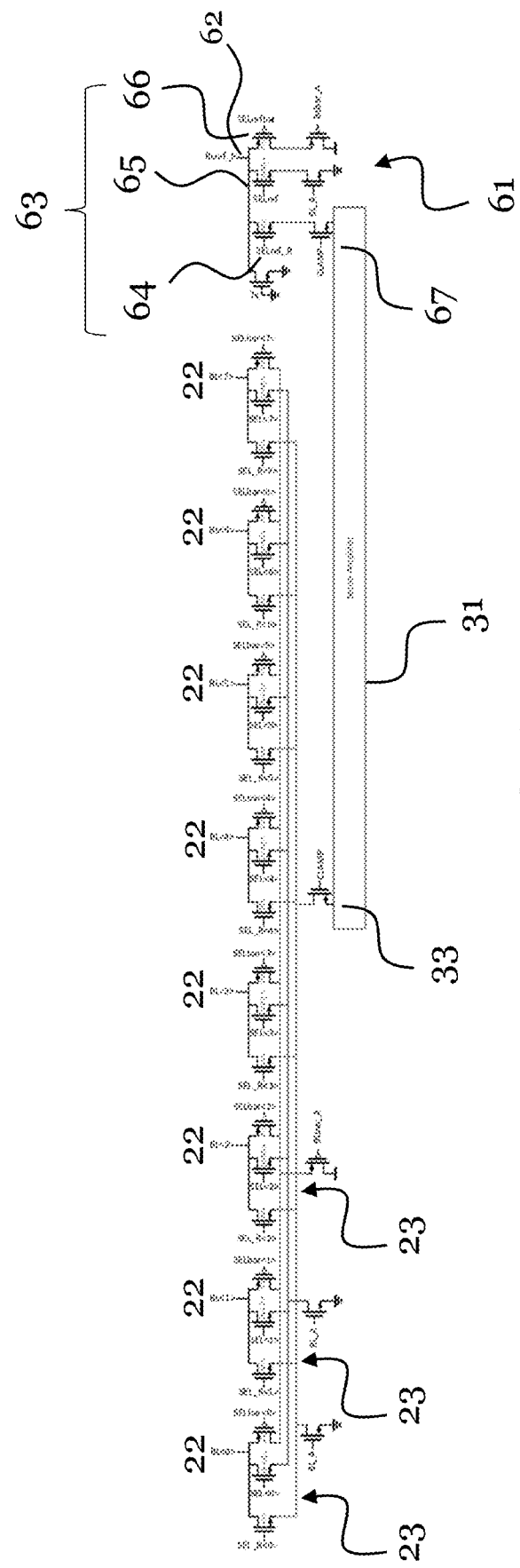
FIG. 5 shows a table indicating an operation of a select device for writing to and reading from a bit line, respectively.
FIG. 6 shows an example of a write-read circuit according to the disclosed technology, for multiplexing write and read operations using bit lines of a memory device.

FIG. 5 shows a table summarizing the solution implemented in embodiments of the disclosed technology.

Embodiments of the disclosed technology divide the first multiplexer 21 into a read multiplexer part and a write multiplexer part, which can be achieved by dividing each first select device 23 of the first multiplexer 21 into the first transistor 24 and the second transistor 25. During the write operation, both transistors 24, 25 (SEL_R and SEL are at 1) are turned on. Also the third transistor 32 may be turned on (SELbar is at 0, due to the opposite polarity). During the read operation, only the first transistor 24 is turned on (SEL_R at 1, SEL at 0, and SELbar at 1). This allows for reducing the bit line loading during reading without increasing the periphery area.

FIG. 6 shows another example of a write-read circuit 20 according to the disclosed technology, which builds on the circuit 20 shown in FIG. 3. Same elements are labeled with the same reference signs and may function likewise.

The circuit 20 of FIG. 6 further includes, apart from the first multiplexer 21 already described in FIG. 3, a second multiplexer 61 for multiplexing the write and read operations to the memory device. The second multiplexer 61 includes a plurality of second select devices 63, wherein each second select device 63 is associated with one of a plurality of reference bit lines 62 of the memory device (note that in FIG. 6 only one reference bit line 62 is shown), wherein each reference bit lines 62 is related to one of the bit lines 22. Further, each second select device 63 includes a first transistor 64 and a second transistor 65. Generally, the second multiplexer 61 can be configured in a similar manner as the first multiplexer 23. For instance, the second select devices 63 may be configured in a similar manner as the first select devices 23, for instance, with respect to read current and write current, or in ratio of the transistor width (see above description for the first select devices 23).

The controller 26 is also configured to control the second multiplexer 61. In particular the controller 26 is configured to perform a write operation or a read operation using the particular bit line 22 based on using further a particular reference bit line 62 of the plurality of reference bit lines 62. For the write operation using the particular bit line 22, the controller 26 is configured to turn on both transistors 64, 65 of the second select device 63 that is associated with the particular reference bit line 62. For the read operation using the particular bit line 22, the controller 26 is configured to turn on the first transistor 64 and turn off the second transistor 65 of the second select device 63 that is associated with the particular reference bit line 62.

As shown further in FIG. 6, the sense amplifier 31 may be connected by a second clamp transistor 67 to the second multiplexer 61, to which already the first multiplexer 21 is connected. Further, a write driver (not shown) may be connected to the first multiplexer 21 and the second multiplexer 61.

FIG. 7 shows a write-read method 70 according to an embodiment of the disclosed technology, usable for multiplexing write and read operations to a memory device. The method 70 may be performed using the read-write circuit 20 of FIG. 2.

The method 70 includes a step 71 of performing a write operation using a particular bit line 22 of a plurality of bit lines 22 of the memory device, by turning on a first transistor 24 and a second transistor 25 of a first select device 23 of a first multiplexer 21 of the circuit 20. The first select device 23 is associated with the particular bit line 22. The method 70 further includes a step 72 of performing a read operation using the particular bit line 22, by turning on the first transistor 24 and turning off the second transistor 25 of the first select device 21 associated with the particular bit line 22.

The solutions of embodiments of the disclosed technology, including the write-read circuit 20 and the write-read method 70, can provide several advantages. A main advantage can be that the read delay and the read energy are improved, that is, the read delay and the read energy are decreased, without increasing the periphery area.

In addition, stress on near memory cells may be reduced. Further, it may be possible to modulate the write current. For example, the reduction of the stress on the near memory cell may be reduced by turning on the read transistor(s) 24, 64 during the write operation. Secondly, the modulation of the write current may be achieved by having more current in one direction as in the other direction.

In the above, the disclosed technology has mainly been described with reference to a limited number of examples. However, as is readily appreciated by a person skilled in the art, other examples than the ones disclosed above are equally possible within the scope of the disclosed technology. In embodiments of the disclosed technology, the word "comprising" does not exclude other elements or steps and the indefinite article "a" or "an" does not exclude a plurality. A single element may fulfill the functions of several entities or items.

What is claimed is:

1. A write-read circuit for a memory device, the write-read circuit comprising:
 a first multiplexer for multiplexing write and read operations to the memory device,
 wherein the first multiplexer comprises a plurality of first select devices, wherein each first select device is associated with one of a plurality of bit lines of the memory device, and wherein each first select device comprises a first transistor and a second transistor, wherein a ratio of a transistor width of the second transistor to a transistor width of the first transistor is in a range of 5:1 to 10:1; and
 a controller for controlling the first multiplexer, wherein the controller is configured to:
  for a write operation using a particular bit line of the plurality of bit lines, turn on both the first and the second transistors of the first select device that is associated with the particular bit line, and
  for a read operation using the particular bit line, turn on the first transistor and turn off the second transistor of the first select device that is associated with the particular bit line.

2. The write-read circuit according to claim 1, further comprising:
 a second multiplexer for multiplexing the write and read operations to the memory device,
 wherein the second multiplexer comprises a plurality of second select devices, wherein each second select device is associated with one of a plurality of reference bit lines of the memory device, wherein each of the reference bit lines is related to one of the bit lines, and wherein each second select device comprises a first transistor and a second transistor;
 wherein the controller is also for controlling the second multiplexer, and is further configured to:
  for the write operation using the particular bit line, turn on both the first and the second transistors of the second select device that is associated with a particular reference bit line of the plurality of reference bit lines, which is related to the particular bit line, and for the read operation using the particular bit line, turn on the first transistor and turn off the second transistor of the second select device that is associated with the particular reference bit line.

3. The write-read circuit according to claim 2, further comprising a sense amplifier and a write driver connected, respectively, to the first multiplexer and/or the second multiplexer.

4. The write-read circuit according to claim 3, wherein the sense amplifier is connected by a first clamp transistor to the first multiplexer and by a second clamp transistor to the second multiplexer.

5. The write-read circuit according to claim 1, wherein the first transistor of each select device is configured for a read current of 10-20 µA, and the first transistor and the second transistor of each select device are together configured for a write current of 50-250 µA.

6. The write-read circuit according to claim 1, wherein each select device further comprises a third transistor, and the controller is further configured to:

turn on the third transistor of the select device associated with the particular bit line or a particular reference bit line, if at least one of the first transistor and the second transistor of that select device is turned on for the write operation or the read operation using the particular bit line.

7. The write-read circuit according to claim 6, wherein, for each select device, the first transistor and the second transistor are NMOS transistors, and the third transistor is a PMOS transistor; or the first transistor and the second transistor are PMOS transistors, and the third transistor is an NMOS transistor.

8. A memory device comprising:
a plurality of memory cells;
a plurality of bit lines, wherein multiple memory cells of the plurality of memory cells are connected to each of the bit lines; and
a write-read circuit, comprising:
a first multiplexer for multiplexing write and read operations to the memory device,
wherein the first multiplexer comprises a plurality of first select devices, wherein each first select device is associated with one of the plurality of bit lines of the memory device, and wherein each first select device comprises a first transistor and a second transistor, wherein a ratio of a transistor width of the second transistor to a transistor width of the first transistor is in a range of 5:1 to 10:1; and
a controller for controlling the first multiplexer, wherein the controller is configured to:
for a write operation using a particular bit line of the plurality of bit lines, turn on both the first and the second transistors of the first select device that is associated with the particular bit line, and
for a read operation using the particular bit line, turn on the first transistor and turn off the second transistor of the first select device that is associated with the particular bit line, wherein the write operation using the particular bit line of the plurality of bit lines of the memory device is for writing into one of the memory cells connected to the particular bit line, and wherein the read operation using the particular bit line is for reading from one of the memory cells connected to the particular bit line.

9. The memory device according to claim 8, further comprising:

a plurality of reference bit lines, wherein multiple memory cells of the plurality of memory cells are connected to each of the reference bit lines, wherein each memory cell of the memory device is connected to one of the bit lines and to one of the reference bit lines, wherein the write operation using the particular bit line is for writing into one of the memory cells connected to the particular bit line and to the particular reference bit line, and wherein the read operation using the particular bit line for reading from one of the memory cells connected to the particular bit line and to the particular reference bit line.

10. The memory device according to claim 8, wherein each memory cell of the memory device comprises a magnetic stack, and wherein the memory device is configured to:

in the write operation, pass a current through the magnetic stack or past the magnetic stack; and in the read operation, pass another current through the magnetic stack.

11. The memory device according to claim 8, wherein the memory device is a magnetic random-access memory (MRAM) device, a spin-transfer torque (STT) MRAM device, or a spin-orbit torque (SOT) MRAM device.

12. A write-read method for multiplexing write and read operations to a memory device, the method comprising:

performing a write operation using a particular bit line of a plurality of bit lines of the memory device, wherein performing the write operation comprises turning on a first transistor and a second transistor of a first select device of a first multiplexer, wherein the first select device is associated with the particular bit line, wherein a ratio of a transistor width of the second transistor to a transistor width of the first transistor is in a range of 5:1 to 10:1; and performing a read operation using the particular bit line, wherein performing the read operation comprises turning on the first transistor and turning off the second transistor of the first select device associated with the particular bit line.

13. The write-read method according to claim 12, wherein performing the write operation using the particular bit line further comprises turning on a first transistor and a second transistor of a second select device of a second multiplexer, wherein the second select device is associated with a particular reference bit line of plurality of reference bit lines of the memory device, and wherein the particular reference bit line is related to the particular bit line; and wherein performing the read operation using the particular bit line further comprises turning on the first transistor and turning off the second transistor of the second select device that is associated with the particular reference bit line.

* * * * *